United States Patent
Qi et al.

(10) Patent No.: US 10,325,151 B1
(45) Date of Patent: Jun. 18, 2019

(54) METHOD OF EXTRACTING IMAGE OF PORT WHARF THROUGH MULTISPECTRAL INTERPRETATION

(71) Applicant: Transport Planning and Research Institute Ministry of Transport, Beijing (CN)

(72) Inventors: Yue Qi, Beijing (CN); Yaping Mao, Beijing (CN); Yun Feng, Beijing (CN); Jun Hao, Beijing (CN); Jun Huang, Beijing (CN); Hanbing Sun, Beijing (CN); Yi Yang, Beijing (CN); Wentao Ding, Beijing (CN); Haiyuan Yao, Beijing (CN); Chen Shen, Beijing (CN)

(73) Assignee: TRANSPORT PLANNING AND RESEARCH INSTITUTE MINISTRY OF TRANSPORT, Beijing (CN)

( * ) Notice: Subject to any disclaimer, the term of this patent is extended or adjusted under 35 U.S.C. 154(b) by 0 days.

(21) Appl. No.: 16/205,251

(22) Filed: Nov. 30, 2018

(30) Foreign Application Priority Data

Dec. 5, 2017 (CN) .......................... 2017 1 1264357

(51) Int. Cl.
*G06K 9/46* (2006.01)
*G06K 9/00* (2006.01)
(Continued)

(52) U.S. Cl.
CPC ............. *G06K 9/0063* (2013.01); *G06K 9/40* (2013.01); *G06K 9/44* (2013.01); *G06K 9/4604* (2013.01);
(Continued)

(58) Field of Classification Search
CPC ...... G06K 9/0063; G06K 9/40; G06K 9/6262; G06K 9/44; G06K 9/4604
See application file for complete search history.

(56) References Cited

U.S. PATENT DOCUMENTS

2004/0170327 A1* 9/2004 Kim ................... G06K 9/00711
382/217
2011/0013841 A1* 1/2011 Blain ................. G06K 9/00651
382/174
(Continued)

FOREIGN PATENT DOCUMENTS

CN 102663394 A 9/2012
CN 103020975 A 4/2013
(Continued)

OTHER PUBLICATIONS

Min Dong et al, Research on Port Resource Monitoring Method Based on Object-Oriented Image Analysis Techique, Port Engineering Technology, Oct. 15, 2017, pp. 53-57, vol. 54, No. 5.

*Primary Examiner* — Solomon G Bezuayehu
(74) *Attorney, Agent, or Firm* — Gokalp Bayramoglu

(57) ABSTRACT

A method of extracting an image of a port wharf through multispectral interpretation includes: first, extracting a blurred coastline by assigning values to grayscale values; then, performing a smoothing and noise removal processing on a remote sensing image in a targeted area to extract edge information; sequentially, establishing a multispectral database of a targeted port wharf; and extracting a port wharf using a projected eigenvector, performing an MAF transformation on the regularized kernel function again, projecting multivariate observed values to original eigenvectors, and identifying a remote sensing image area corresponding to the original eigenvector smaller than a transformation variance as a port wharf to be extracted, and then carrying out a validation operation.

8 Claims, 1 Drawing Sheet

(51) Int. Cl.
*G06K 9/44* (2006.01)
*G06K 9/62* (2006.01)
*G06K 9/40* (2006.01)

(52) U.S. Cl.
CPC . *G06K 9/6262* (2013.01); *G06K 2009/00644* (2013.01)

(56) References Cited

U.S. PATENT DOCUMENTS

| | | | |
|---|---|---|---|
| 2012/0101795 A1* | 4/2012 | Blain | G06F 17/5018 703/9 |
| 2013/0287252 A1* | 10/2013 | Bruun | G06T 7/0012 382/103 |
| 2016/0379053 A1* | 12/2016 | Chen | G06K 9/00637 382/103 |
| 2017/0024867 A1 | 1/2017 | Bousquet et al. | |

FOREIGN PATENT DOCUMENTS

| | | |
|---|---|---|
| CN | 104063870 A | 9/2014 |
| CN | 105740794 A | 7/2016 |
| CN | 106407938 A | 2/2017 |
| CN | 106407940 A | 2/2017 |
| CN | 107358161 A | 11/2017 |

* cited by examiner

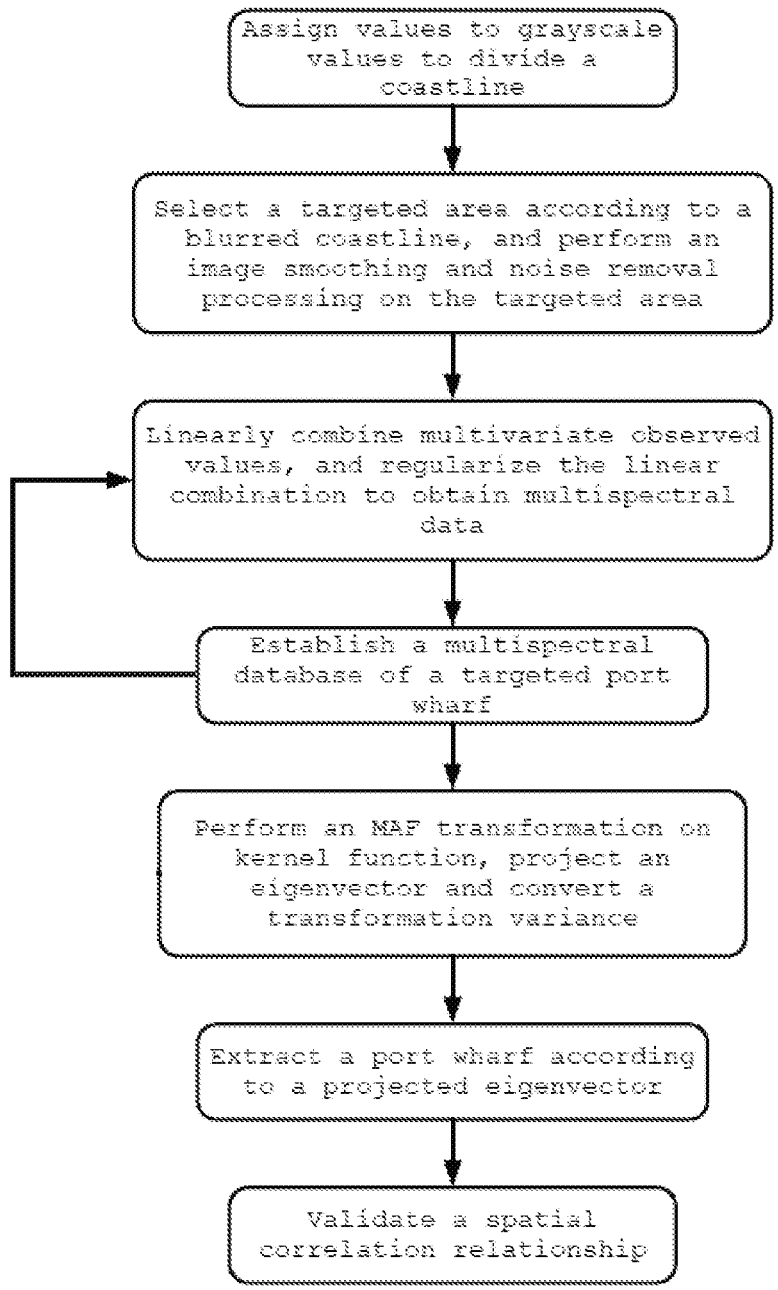

METHOD OF EXTRACTING IMAGE OF PORT WHARF THROUGH MULTISPECTRAL INTERPRETATION

CROSS REFERENCE TO THE RELATED APPLICATIONS

The present application claims priority to Chinese Patent Application No. 2017112643570 filed on Dec. 5, 2017, the entire content of which is incorporated herein by reference.

TECHNICAL FIELD

The present invention relates to the field of remote sensing recognition technologies, and particularly to a method of extracting an image of a port wharf through multispectral interpretation.

BACKGROUND

Along with the determination of marine economy development strategies and the rapid development of marine economy enterprises, sea port management becomes more and more important; to develop and utilize these resources rationally, it is necessary to make proper investigations and evaluations, and in the prior art, making an investigation based on a remote sensing image is an effective way to evaluate an sea port. An investment method based on a remote sensing image achieves effective resource utilization and management mainly by extracting a spectral image of a port by means of satellite remote sensing, aerial photography and the like, and then extracting characteristics of a ground object, for example, a wharf in the port, using a remote sensing image interpretation technology.

Spectral characteristics are characteristics uniquely possessed by each ground object in a remote sensing image. Thus, recognizing a port wharf in a remote sensing image using multiple spectrums is a technical means commonly used at present; in the prior art, for example, in a method of segmenting a wharf and a ship by combining characteristics of multi-source remote sensing images, which is disclosed in Patent Application No. 201210591353.4, a wharf and a ship are segmented using multivariate characteristics of multi-source images, and more target information is acquired by the complementarity between different types of remote sensing images, thus increasing the accuracy of wharf and ship segmentation.

However, taking an overall view of the foregoing technical solution, actually existing problems and the currently widely used technical solutions, the following major defects are found:

(1) with the development of high-resolution optical images, desired information is extracted using a remote sensing image while corresponding information is frequently extracted directly based on a high-resolution remote sensing image, but the direct extraction of port wharf information is inadvisable because an actual high-resolution image contains a complicated sea condition and abundant texture details, a simple direct recognition needs an extremely large database to provide a recognition basis, moreover, the actual computation burden and correction algorithms are also considerable; and (2) in a direct recognition process, a port wharf is detected only using geometrical information or spectral information, resulting in inadequate information utilization and lowered recognition accuracy and thus reducing the reliability of a detection result, moreover, in a case where a recognition is carried out using geometrical information, the recognition may fail because of an error.

SUMMARY

A technical solution adopted by the present invention to solve the technical problems is a method of extracting an image of a port wharf through multispectral interpretation, comprising the following steps:

S100: assigning values to grayscale values to divide a coastline; performing a grayscale processing on the original remote sensing image, assigning values to grayscale values, and extracting a blurred coastline according to the distribution of the grayscale values;

S200: smoothing the image and removing noise; performing a smoothing processing on an area of the blurred coastline in the original remote sensing image according to a range limited by the blurred coastline and removing interference noise to extract edge information;

S300: establishing a multispectral database of a targeted port wharf; linearly combining multivariate observed values among different edge information, regularizing the linear combination to obtain a kernel function, that is, multispectral data, and repeating the foregoing process to obtain a multispectral database; and S400: extracting a port wharf using a projected eigenvector, performing an MAF transformation on the regularized kernel function, projecting the multivariate observed values to original eigenvectors, and identifying a remote sensing image area corresponding to a validated original eigenvector as a port wharf to be extracted.

As a preferred technical solution of the present invention, in step S100: different values are assigned to remote sensing images of different grayscales, and a value '0' is assigned to the grayscale value of a water area in a remote sensing image and a value '10' to the part on land having a maximum grayscale value.

As a preferred technical solution of the present invention, in step S100: extracting a coastline by assigning values to grayscale values specifically includes the following steps:

S101: first, performing a uniform grayscale processing on the original remote sensing image and dividing areas having different grayscale values, then calculating grayscale value variances for the divided areas to obtain a grayscale distribution uniformity coefficient;

S102: checking the grayscale value variances calculated in S101, selecting and determining a variance contrast value, identifying an area where a grayscale value is smaller than the variance contrast value as a water area and an area where a grayscale value is greater than the variance contrast value as a land area; and S103: restoring distinct boundary lines existing between the water area and the land area that are identified through the foregoing steps to a continuous boundary line using an interpolation method, wherein the continuous boundary line forms the blurred coastline.

As a preferred technical solution of the present invention, after the blurred coastline is extracted by assigning values to grayscale values, a preprocessing is carried out for the remote sensing image, the preprocessing includes geometric correction, atmospheric correction and radiation correction.

As a preferred technical solution of the present invention, in step S200, the image is smoothed using any one of mean value smoothing, median filtering or Gaussian blur filtering, wherein the median filtering and the Gaussian blur filtering both employ a normalized ratio method and use the following specific calculation formula:

NDWI=(Green−NIR)/(Green+NIR), where Green represents a green light waveband image, NIR represents a near-infrared waveband image, and NDWI represents a combination of wavebands.

As a preferred technical solution of the present invention, in step S300, the MAF transformation is performed on an image in an edge region before the linear combination operation is performed, so as to obtain an autocorrelation factor, and the specific algorithm is as follows:

$\alpha^T x$ (r) is set as an autocorrelation factor, x (r) as a multivariate observed value at a point r, x (r+δ) as a multivariate observed value at a point r+δ, and δ as a spatial displacement vector, then an auto-covariance R of a linear combination $\alpha^T x$ (r) of x (r) is calculated according to the following formula: R=Cov{$\alpha^T x$(r), $\alpha^T x$ (r+δ)}, and the autocorrelation factor is obtained after an inverse operation is performed on the auto-covariance R.

As a preferred technical solution of the present invention, in step S300, the linear combination and the regularization thereof include the following steps:

S301: transforming the auto-covariance R to obtain the following equation: $\alpha^T C_\delta \alpha = \alpha^T (C_\delta + C_\delta^T)\alpha/2$, where $C_\delta$ is a transformation-related matrix;

S302: setting an autocorrelation coefficient ρ of the linear combination as follows: $\rho = 1 - (\alpha^T S_\delta \alpha)/(2\alpha^T S\alpha)$, where a difference covariance matrix $S_\delta$ is calculated according to the following formula: $S_\delta = 2S - (C_\delta + C_\delta^T)$, and $S = X^T X/(n-1)$ is set as a covariance matrix of x; and S303: selecting the following optional form of the autocorrelation coefficient:

$$\rho = 1 - \frac{1}{2}[(\alpha^T X^T A\alpha)/(\alpha^T[(1-k)X_\delta^T X_\delta + kI_p)]\alpha]^{-1},$$

transforming the optional form to obtain the following kernel function form:

$$\rho = 1 - \frac{1}{2}[(b^T K^2 b)/(b^T[(1-k)K_\delta K_\delta^T + kK)]b]^{-1},$$

where $X^T b = \alpha$, A is a transformation factor, k is a transformation coefficient, $I_p$ is a unit vector of the eigenvector P, and K is a correlation matrix of a transformation coefficient.

As a preferred technical solution of the present invention, in step S400, after the regularization is performed, the original eigenvector is set to be $a_i$, then a projection algorithm of the original eigenvector is as follows:

$\varphi(x)^T a_i = \varphi(x)^T \varphi^T b_i = [k(x,x_1), k(x,x_2), \ldots, k(x,x_N)] b_i.$ As a preferred technical solution of the present invention, a validation method specifically includes: comparing the original eigenvector with a transformation variance, and determining that the original eigenvector smaller than the transformation variance meets a requirement, wherein a specific algorithm of the transformation variance is as follows:

a column of a matrix A is set as $a_i$ and that of a matrix B is set as $b_i$, then φA=KB, in this case, the transformation variance is calculated according to the following formula $$\text{Var}\{a_{i\delta}^T \varphi(x)\} =$$

$$a_{i\delta}^T \varphi^T a_i/(n-1) = b_i \varphi \varphi^T \varphi \varphi^T b_i/(n-1) = b_{i\delta}^T K^2 b_i/(n-1) = 1/(n-1),$$

where n is the number of times extraction is performed.

As a preferred technical solution of the present invention, the method further includes a step S500 of validating a spatial correlation relationship, which specifically includes:

based on steps S100 and S200, obtaining a spatial correlation relationship of the blurred coastline obtained through the assignment of values to grayscales and an image processing operation, and validating, using the spatial relationship, a spatial correlation relationship for the port wharf recognized in the step S400.

Compared with the prior art, the present invention has the following beneficial effects: the method disclosed herein, which first performs a grayscale processing on the original remote sensing image to divide a water area from a land area and thus determines the approximate location of a port wharf, and then performs a multispectral processing on the location and directly switches the remote sensing image to a related data calculation based on an MAF transformation, is capable of recognizing a port wharf rapidly and accurately by comparing characteristic spectrums, and improving the accuracy of a characteristic spectrum from the source by carrying out an error correction for a remote sensing image during a recognition process, moreover, the method is further capable of validating a spatial correlation relationship during a recognition process and thus improving recognition accuracy.

BRIEF DESCRIPTION OF THE DRAWINGS

FIG. 1 is a schematic diagram illustrating a flow according to the present invention.

DETAILED DESCRIPTION OF THE EMBODIMENTS

Technical solutions of the present invention will be described clearly and completely below in conjunction with accompanying drawings set forth therein, and apparently, the embodiments described herein are merely a part of, but not all of the embodiments of the present invention. All other embodiments devised by those of ordinary skill without any creative work based on the embodiments described herein should fall within the scope of the present invention.

As shown in FIG. 1, the present invention provides a method of extracting an image of a port wharf through multispectral interpretation, comprising the following steps:

S100: assigning values to grayscale values to divide a coastline, performing a grayscale processing on the original remote sensing image, assigning different values to remote sensing images of different grayscales, and extracting a blurred coastline according to the distribution of the grayscale values.

When the values are assigned to the grayscales on a basis of a guaranteed resolution in the step above, it should be noted that because in a remote sensing image, a water area generally has a relatively low grayscale value and is uniformly distributed in grayscale, the representation vector of the grayscale value of a water area is variance, whereas the grayscale value of a land is relatively high and has a great variance, a distinct boundary line exists between a water area and a land area. To represent characteristics of a boundary line better and prominently on a digital map, it is set that in a remote sensing image, a value '0' is assigned to the grayscale value of a water area and a value '10' to the part on a land having a maximum grayscale value during a value assignment process, and the other grayscale values are proportionally adjusted according to the magnitude of grayscale, it should further be noted that assigning a value '10' to the part on a land having a maximum grayscale value specifically refers to performing a normal value assignment after removing scattered extremely-high grayscale values in order to effectively decrease processing errors and avoid the inclusion of 'polluted data'.

Therefore, in the assignment of the values to the grayscale values, the values are assigned to the grayscale values and the coastline is extracted by executing the following steps:

S101: first, performing a uniform grayscale processing on the original remote sensing image, then dividing areas having different grayscale values, and calculating a grayscale value variance for the divided areas to obtain a grayscale distribution uniformity coefficient;

S102: checking the grayscale value variance calculated in S101, selecting and determining a variance contrast value, identifying an area where a grayscale value is smaller than the variance contrast value as a water area and an area where a grayscale value is greater than the variance contrast value as a land area; and S103: restoring distinct boundary lines existing between the water area and the land area identified in the foregoing steps to a continuous boundary line using an interpolation method, wherein the continuous boundary line forms the blurred coastline.

After the blurred coastline is extracted by assigning the values to the grayscale values, a preprocessing is carried out for the remote sensing image, the preprocessing includes geometric correction, atmospheric correction and radiation correction.

The effect of the geometric correction is to make coordinates of a ground object in a remote sensing image more conform to reality, correct a coordinate error occurring in remote sensing, and cause a recognition result to be closer to an actual result.

The atmospheric correction refers to eliminating the effect caused by a cloud block to a remote sending image after performing a geometric correction.

The effect of the radiation correction is to eliminate the effect caused by the radiation of a ground object to a remote sensing image.

The foregoing correction methods can be directly executed using a piece of image processing software in the prior art. In a corrected remote sensing image, texture characteristics of a ground object in a corrected remote sensing image meet an extraction requirement.

S200: smoothing the image and removing noise; performing a smoothing processing on an area of the blurred coastline in the original remote sensing image according to a range limited by the blurred coastline and removing interference noise to extract edge information.

Sea spray is common in the sea, and in a remote sensing image, a breaking wave of sea spray has a grayscale value that is close to the grayscale value of a wharf, if the image smoothing and noise removal is not performed, big problems will be brought to a subsequent recognition, which will increase recognition errors that are transferred and magnified in continuously repeated recognition calculation, moreover, the amount of the calculation conducted in a recognition process will be greatly increased.

In step S200, the image is smoothed through any one of mean value smoothing, median filtering or Gaussian blur filtering, wherein the median filtering and the Gaussian blur filtering both employ a normalized ratio method and use the following specific calculation formula:

$$NDWI=(Green-NIR)/(Green+NIR),$$

where Green represents a green light waveband image, NIR represents a near-infrared waveband image, and NDWI represents a waveband combination.

The median filtering, because of its capability of effectively preserving edge information while suppressing noise, is more likely to be adopted herein for an image smoothing processing, the Gaussian blur filtering is the second choice, and the mean value smoothing is not recommended for a smoothing processing.

It should further be emphasized here that during the image smoothing and noise removal process, the present invention mainly uses an optical band, based on a fundamental principle that water body information is extracted according to the characteristic difference between a water body and a land in reflections of green lights and near-infrared waves, and a threshold '0' is set in a calculation process, that is, a calculation result being a negative value represents a water area, and the other non-water areas are all represented by positive values.

Before performing the multispectral extraction, it should be explicated that a multispectral waveband mentioned herein includes four wavebands: a blue light waveband, a green light waveband, a red light waveband and a near-infrared light wave band.

S300: establishing a multispectral database of a targeted port wharf; linearly combining multivariate observed values among different edge information, regularizing the linear combination to obtain a kernel function, that is, multispectral data, and repeating the foregoing process to obtain a multispectral database.

An MAF transformation is performed on an image in an edge region before the linear combination is performed, so as to obtain an autocorrelation factor, and the specific algorithm is as follows:

$\alpha^T x$ (r) is set as an autocorrelation factor, x (r) as a multivariate observed value at a point r, x (r+$\delta$) as a multivariate observed value at a point r+$\delta$, and $\delta$ as a spatial displacement vector, then an auto-covariance R of a linear combination $\alpha^T x$ (r) of x (r) is calculated according to the following formula: $R=Cov\{\alpha^T x(r), \alpha^T x (r+\delta)\}$, and the autocorrelation factor is obtained after an inverse operation is performed on the auto-covariance R.

What should be explicated in the description above is the MAF transformation, which refers to a maximum/minimum autocorrelation factor transformation that focuses on spatial characteristics of a remote sensing image, and the use of spatial characteristics of a remote sensing image for recognition is necessary in multispectral recognition because spatial characteristics of a ground object are corresponding to a unique characteristic spectrum, thus, by extracting a characteristic spectrum and applying the extracted characteristic spectrum to recognition, a corresponding demarcated object can be recognized easily and accurately.

After the MAF transformation is performed on the image, it is necessary to take a covariance matrix of the image into consideration, and it is needed to eliminate a covariance matrix of the difference between original data and offset data because the MAF transformation is based on the autocorrelation of data.

In the description above, a remote sensing image should be regarded as an observed data set with n pixels and p spectral bands, and in this case, the MAF maximizes a correlation factor of a linear combination $\alpha^T x$ (r) of the original variable x(r).

Specifically, the linear combination and the regularization thereof include the following steps:

S301: transforming the auto-covariance R to obtain the following equation: $\alpha^T C_\delta \alpha = \alpha^T (C_\delta + C_\delta^T)\alpha/2$, where $C_\delta$ is a transformation-related matrix;

S302: setting an autocorrelation coefficient ρ of the linear combination as follows: $\rho = 1 - (\alpha^T S_\delta \alpha)/(2\alpha^T S\alpha)$, where a difference covariance matrix $S_\delta$ is calculated according to the following formula: $S_\delta = 2S - (C_\delta + C_\delta^T)$, and $S = X^T X/(n-1)$ is set as a covariance matrix of x; and S303: selecting the following optional form of the auto-correlation coefficient:

$$\rho = 1 - \frac{1}{2}[(\alpha^T X^T A\alpha)/(\alpha^T[(1-k)X_\delta^T X_\delta + kI_p)]\alpha]^{-1},$$

transforming the optional form to obtain the following kernel function form:

$$\rho = 1 - \frac{1}{2}[(b^T K^2 b)/(b^T[(1-k)K_\delta K_\delta^T + kK)]b]^{-1}$$

where $X^T b = \alpha$, A is a transformation factor, k is a transformation coefficient, $I_p$ is a unit vector of the eigenvector P, and K is a correlation matrix of a transformation coefficient.

In step S303, it should be noted that in the transformation of a kernel function form, as long as one linear transformation is found through the MAF transformation, the found linear transformation is regularized first for the sake of convenience of subsequent operations, so that each linear transformation can have a corresponding optional form corresponding to the original mode and the kernel function form can be obtained through a transformation.

S400: extracting a port wharf using a projected eigenvector, performing the MAF transformation on the regularized kernel function, and projecting multivariate observed values to original eigenvectors, and determining a remote sensing image area corresponding to the original eigenvector smaller than a transformation variance as a port wharf to be extracted.

In step S400, after the regularization is performed, the original eigenvector is set to be $a_i$, then a projection algorithm of the original eigenvector is as follows:

$$\varphi(x)^T a_i = \varphi(x)^T \varphi^T b_i = [k(x,x_1), k(x,x_2), \ldots, k(x,x_N)] b_i.$$

Additionally, a specific algorithm of the transformation variance is as follows:

a column of a matrix A is set as $a_i$, and that of a matrix B is set as $b_i$, then $\varphi A = KB$, in this case, the transformation variance is calculated according to the following formula:

$$\text{Var}\left\{a_i^T \varphi(x)\right\} =$$

$$a_i^T a_i/(n-1) = b_i \varphi \varphi^T \varphi \varphi^T b_i/(n-1) = b_i^T K^2 b_i/(n-1) = 1/(n-1),$$

where n is the number of times extraction is performed.

In the present invention, it should also be noted that although a port wharf can be effectively determined by recognizing characteristics of multiple spectrums, the spatial characteristic relationship of a port wharf relies not only on the recognition of multiple spectrums in actual applications.

Thus, a step S500 of validating a spatial correlation relationship is also included here, which specifically includes:

based on steps S100 and S200, obtaining a spatial correlation relationship of the blurred coastline obtained through the assignment of values to grayscales and an image processing, and validating, using the spatial relationship, a spatial correlation relationship for the port wharf recognized in the step S400.

A detection can be carried out by making full use of the correlation of spatial relationships to increase the accuracy of a validation further, the correlation of spatial relationships of a port wharf is relatively simple, for example, in the aspect of the spatial correlation relationship of a port wharf, what should be taken into consideration merely includes: a departing channel water system, transshipment roads, transshipment squares, warehouses and the like, whose characteristics can be simply recognized through remotely sensed spectral characteristics; in the recognition method provided herein, even just by assigning values to grayscale values, a port wharf can be recognized through the values assigned to the grayscales, and a the recognized port wharf can be conveniently checked through a matching operation.

To sum up, the main features of the present invention lie in that:

(1) the present invention, which first performs a grayscale processing on the original remote sensing image to divide a water area from a land area and thus determines the approximate location of a port wharf, and then carries out a multispectral processing on the location and switches the remote sensing image directly to the calculation of related data based on an MAF transformation, is capable of recognizing a port wharf rapidly and accurately by comparing characteristic spectrums; and (2) by carrying out an error correction for a remote sensing image during a recognition process, the present invention improves the accuracy of a characteristic spectrum from the source, moreover, by validating a recognition using a spatial correlation relationship during a recognition process, the present invention improves recognition accuracy.

It is apparent for those skilled in the art that the present invention is not limited to details of the foregoing exemplary embodiments and the present invention can be realized in other specific forms without departing from the spirit or basic characteristics of the present invention. Thus, the embodiments should be regarded as exemplary but not limitative in any aspect; because the scope of the present invention is defined by appended claims but not the foregoing description, the present invention is intended to cover all the variations falling within the meaning and scope of an equivalent of the claims. Any reference symbol in the claims should not be construed as limiting a relevant claim.

What is claimed is:

1. A method of extracting an image of a port wharf through multispectral interpretation, comprising the following steps:

S100: assigning values to grayscale values to divide a coastline: performing a grayscale processing on an original remote sensing image, assigning the values to the grayscale values, and extracting a blurred coastline according to a distribution of the grayscale values;

S200: smoothing the original remote sensing image and removing noise: performing a smoothing processing on an area of the blurred coastline in the original remote sensing image according to a range limited by the blurred coastline and removing interference noise to extract edge information;

S300: establishing a multispectral database of a targeted port wharf: linearly combining multivariate observed values among different edge information, regularizing a linear combination to obtain a kernel function as multispectral data, and repeating to obtain the multispectral database, wherein a maximum and/or minimum autocorrelation factor (MAF) transformation is performed on the image in an edge region before an operation of the linear combination is performed, in order to obtain an autocorrelation factor, and a specific algorithm is as follows:

$\alpha^T x$ (r) is set as the autocorrelation factor, x (r) as a first multivariate observed value at a point r, x (r+δ) as a second multivariate observed value at a point r+δ, and δ as a spatial displacement vector, then an auto-covariance R of a linear combination $\alpha^T x$ (r) of x(r) is calculated according to the following formula: R=Cov{$\alpha^T$x(r), $\alpha^T$x (r+δ)}, and the autocorrelation factor is obtained after an inverse operation is performed on the auto-covariance R;

the linear combination and a regularization of the linear combination comprises the following steps:

S301: transforming the auto-covariance R to obtain the following equation: $\alpha^T C_\delta \alpha = \alpha^T (C_\delta + C_\delta^T)\alpha/2$, where $C_\delta$ is a transformation-related matrix:

S302: setting an autocorrelation coefficient ρ of the linear combination as follows: $\rho = 1 - (\alpha^T S_\delta \alpha)/(2\alpha^T S\alpha)$, where a difference covariance matrix $S_\delta$ is calculated according to the following formula: $S_\delta = 2S - (C_\delta + C_\delta^T)$, and $S = X^T X/(n-1)$ is set as a covariance matrix of x;

and S303: selecting an optional form of the autocorrelation coefficient as following:

$$\rho = 1 - \frac{1}{2}[(\alpha^T X^T A \alpha)/(\alpha^T[(1-k)X_\delta^T X_\delta + kI_p)]\alpha]^{-1},$$

transforming the optional form to obtain a kernel function form as following:

$$\rho = 1 - \frac{1}{2}[(b^T K^2 b)/(b^T[(1-k)K_\delta K_\delta^T + kK)]b]^{-1},$$

where $X^T b = \alpha$, A is a transformation factor, k is a transformation coefficient, $I_p$ is a unit vector of a eigenvector P, and K is a correlation matrix of the transformation coefficient; and S400: extracting a port wharf using a projected eigenvector: performing an MAF transformation on the kernel function after being regularized, projecting the multivariate observed values to original eigenvectors, and identifying a remote sensing image area corresponding to a validated original eigenvector as a port wharf to be extracted.

2. The method of extracting the image of the port wharf through multispectral interpretation according to claim 1, wherein in step S100: different values are assigned to remote sensing images of different grayscales, and a value '0' is assigned to a grayscale value of a water area in a remote sensing image and a value '10' to a part on land having a maximum grayscale value.

3. The method of extracting the image of the port wharf through multispectral interpretation according to claim 1, wherein in step S100: extracting a coastline by assigning the values to the grayscale values specifically comprises the following steps:

S101: first, performing a uniform grayscale processing on the original remote sensing image and dividing areas having different grayscale values, then calculating grayscale value variances for the areas after being divided to obtain a grayscale distribution uniformity coefficient;

S102: checking the grayscale value variances calculated in S101, selecting and determining a variance contrast value, identifying an area where a grayscale value is smaller than the variance contrast value as a water area and an area where a grayscale value is greater than the variance contrast value as a land area; and S103: restoring distinct boundary lines existing between the water area and the land area to a continuous boundary line to be as the blurred coastline by an interpolation method, wherein the distinct boundary lines are identified through S101 and S102.

4. The method of extracting the image of the port wharf through multispectral interpretation according to claim 1, wherein after the blurred coastline is extracted by assigning the values to the grayscale values, a preprocessing is carried out for the remote sensing image, and the preprocessing includes geometric correction, atmospheric correction and radiation correction.

5. The method of extracting the image of the port wharf through multispectral interpretation according to claim 1, wherein in step S200, the original remote sensing image is smoothed by using any one of mean value smoothing, median filtering or Gaussian blur filtering, wherein, the median filtering and the Gaussian blur filtering both employ a normalized ratio method and use the following specific calculation formula:

NDWI=(Green−NIR)/(Green+NIR), where Green represents a green light waveband image, NIR represents a near-infrared waveband image, and NDWI represents a combination of wavebands.

6. The method of extracting the image of the port wharf through multispectral interpretation according to claim 1, wherein, in step 400, an original eigenvector is set to be $a_i$ after the regularization is performed, then, a projection algorithm of the original eigenvector is as follows:

$\varphi(x)^T a_i = \varphi(x)^T \varphi^T b_i = [k(x,x_1), k(x,x_2), \ldots, k(x,x_N)]b_i$.

7. The method of extracting the image of the port wharf through multispectral interpretation according to claim 1, wherein, a validation method comprises: comparing an original eigenvector with a transformation variance, and determining that the original eigenvector smaller than the transformation variance meets a requirement, wherein a specific algorithm of the transformation variance is as follows:

a column of a matrix A is set as $a_i$ and that of a matrix B is set as $b_i$, then $\varphi A = KB$, in this case, the transformation variance is calculated according to the following formula:

$$\operatorname{Var}\left\{a_{i\delta}^T \varphi(x)\right\} =$$
$$a_{i\delta}^T \varphi^T a_i/(n-1) = b_i \varphi \varphi^T \varphi \varphi^T b_i/(n-1) = b_{i\delta}^T K^2 b_i/(n-1) = 1/(n-1),$$

where n is the number of times the extraction is performed.

8. The method of extracting the image of the port wharf through multispectral interpretation according to claim 1, further comprising:
   a step S500 of validating a first spatial correlation relationship, which specifically comprises:
   based on steps S100 and S200, obtaining a second spatial correlation relationship of the blurred coastline obtained through an assignment of the values to the grayscales and an image processing operation, and validating the first spatial correlation relationship for the port wharf recognized in the step S400 by using the second spatial correlation relationship.

* * * * *